No. 827,580. PATENTED JULY 31, 1906.
E. L. THOMPSON & A. E. SHELDON.
SCALE TRUCK.
APPLICATION FILED JAN. 16, 1906.
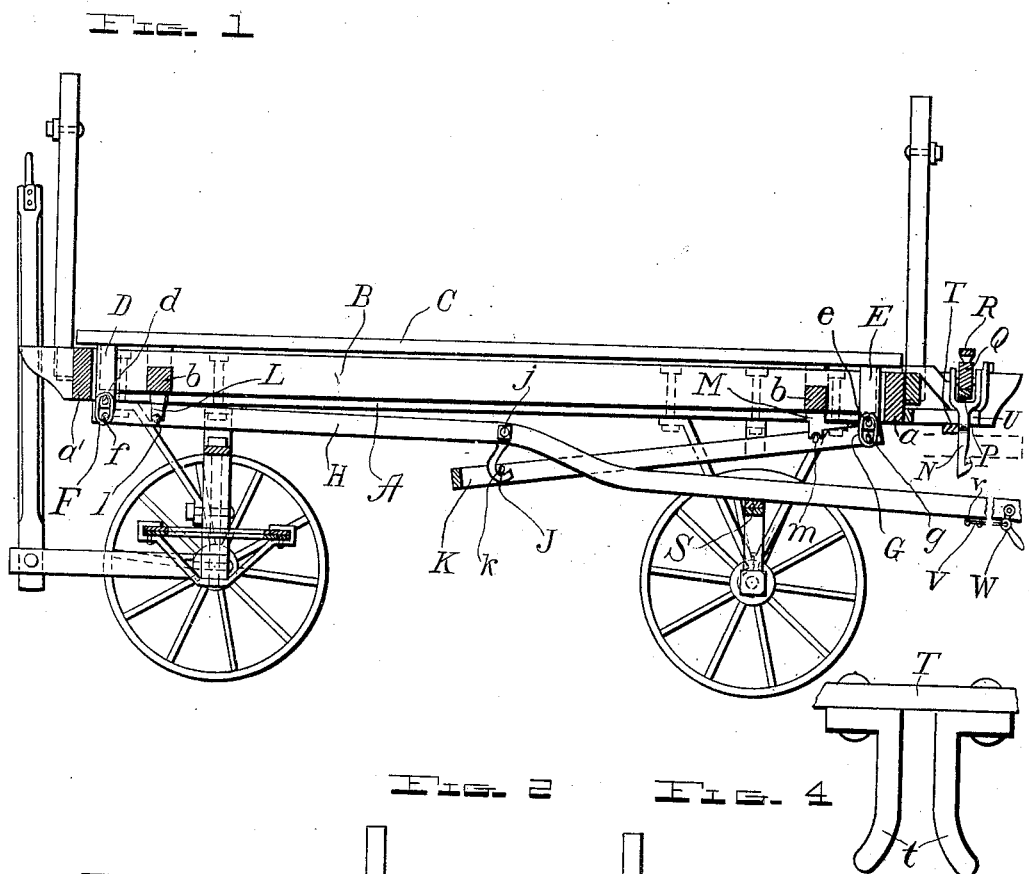
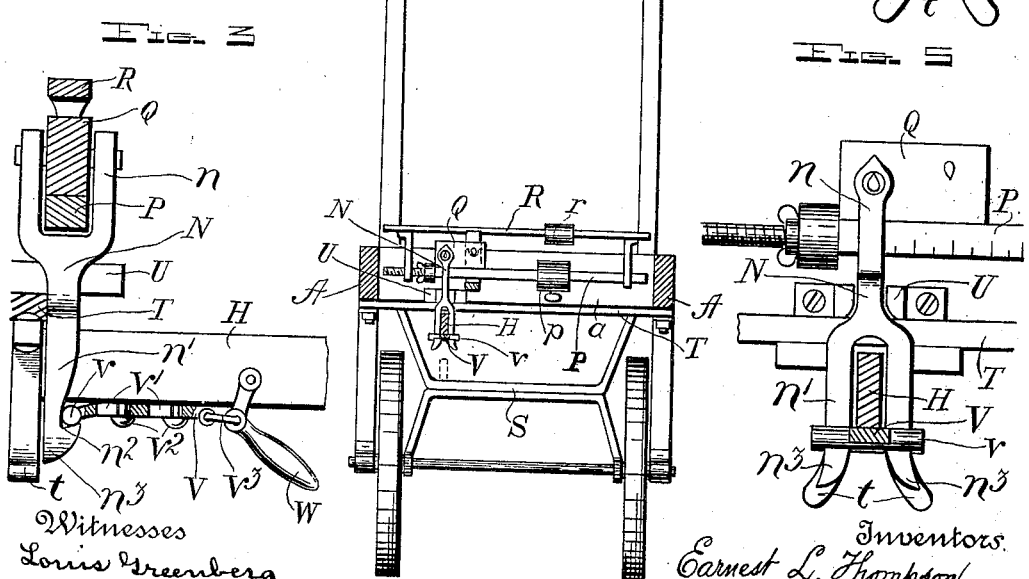
Witnesses
Lorris Greenberg
Edwin Guthrie
Inventors
Earnest L. Thompson
Artimus E. Sheldon
By Harvey Spalding Sons. Attorneys.

UNITED STATES PATENT OFFICE.

EARNEST L. THOMPSON AND ARTIMUS E. SHELDON, OF BLUFFTON, INDIANA.

SCALE-TRUCK.

No. 827,580.  Specification of Letters Patent.  Patented July 31, 1906.

Application filed January 16, 1906. Serial No. 296,346.

*To all whom it may concern:*

Be it known that we, EARNEST L. THOMPSON and ARTIMUS E. SHELDON, citizens of the United States, residing at Bluffton, in the county of Wells and State of Indiana, have invented certain new and useful Improvements in Scale-Trucks, of which the following is a specification.

Our invention relates to scale-trucks, and belongs to that class of vehicles adapted for transporting baggage or freight and constructed to include certain adjustable parts constituting scale-levers and scale-beams, whereby the weight of the load may be determined.

The object of our invention is to provide a scale-truck with devices by which the main or longer scale-lever is connected and released from the scale-beam, accordingly as the load is to be weighed or simply borne upon the platform of the truck to be carried from one place to another.

We accomplish the object stated by fashioning and associating the parts substantially as illustrated in the accompanying drawings, of which—

Figure 1 is a side view lengthwise of the entire truck. Fig. 2 is an end view showing the scale-beam and its immediate attachments. Fig. 3 is a fragmentary detail view, somewhat enlarged, showing the double-ended fork-coupling and the sliding latch by which it is connected with the long scale-lever. Fig. 4 is a front view of a portion of the cross-bar stop and shows the divergent guide-fingers sometimes employed. Fig. 5 is a fragmentary front view of the end portion of the scale-beam and shows the coupling-fork and related parts.

Like reference-letters are used for like parts throughout.

Letter A designates the horizontal frame of the truck, having the end pieces $a\ a$ at the ends, and B marks the frame of the platform C of the truck, having the cross-pieces $b\ b$. Cross-bars D and E, upon which the platform is directly supported when employed only as a truck, are attached to the main frame A within the ends $a\ a$.

Letters F and G mark links connecting the knife-edges $d, e, f$, and $g$. H designates the long scale-lever (shown in Fig. 1) as extending beyond the end of the truck at the right. By means of the hook J, pivotally connected with lever H by bolt $j$, the shorter lever K is movably in contact with lever H through the knife-edge $k$ of the short lever. The fulcrums of the scale-levers are afforded by means of the downwardly-projecting blocks L and M, secured beneath the cross-pieces $b\ b$ of the platform-frame, and the knife-edges $l$ and $m$, with which the levers H and K are provided. When the lever H is lowered, as shown in Fig. 1, the platform rests upon the cross-bars D and E, and the weighing elements are not engaged. When the lever H is raised, the platform is lifted from the cross-bars and the truck may be employed as a scale, and it is with the special devices adapted to couple the long lever and scale that our invention is most directly related.

The parts heretofore described are common to many trucks of this nature, and no further description of them is believed to be needful.

The coupling N is provided with an upper fork $n$ and a lower fork $n'$, and the lower fork has the latch-notch $n^2$ and diverging ends $n^3$, having curved faces. As shown, the fork hangs from knife-edges projecting from the beam-block erected upon the scale-beam P. The block is referred to by letter Q.

The letter R marks an upper scale-beam found in certain forms of scales which we prefer to use with our invention. The sliding balance-weights on the scale-beams are designated by letters $p$ and $r$.

The letter S refers to the upper member of the twin braces extending from the axle to the frame of the truck between the wheels, and it is upon the brace S that the long lever H rests when it is in its lower position, as illustrated in Fig. 1 and indicated by the broken lines in Fig. 2.

Letter T designates a cross-bar extending from one side of the truck-frame to the other, as shown in Fig. 2. In Figs. 2 and 5 it will be noted that the bottom surface of the bar T falls somewhat below the crotch of the fork $n'$ of coupling N. It is thought to be clear, therefore, that if the lever H be raised and guided by the ends $n^3$ into fork $n'$ its upward movement will be halted by striking bar T before coming into contact with the crotch of the fork. Thus the fork is spared repeated jars, as will readily be understood.

It is desired that the coupling N shall hang vertically in approximately a constant attitude, and the arms U, shown as extending from cross-piece $a$ of frame A, are introduced each side of the coupling to limit lateral swinging movement of the coupling. Attention is directed also here to the fact that the arms are fixed directly above the portion of the cross-bar T at which the blows occur when the long lever H is raised to couple the scale, and the bar is thus reinforced to that extent.

We find that it is advantageous, although not absolutely necessary, to provide an auxiliary guide for the rising end of lever H. This we do by securing the fingers $t\ t$ beneath the bar T and immediately in rear of the lower fork of the coupling. As best shown in Fig. 5, it will be observed that the rising lever, should it swerve to either side in its ascent, will first strike the guide-fingers $t\ t$ and be directed into the fork $n'$. Here again the coupling is guarded from injury possibly resulting from repeated shocks.

The sliding latch V, shown beneath lever H, possesses the transverse latch-bar $v$ at the end. It has two slots $v'$, through which the pins $v^2$ pass into the lever H and are secured therein. The link $v^3$ pivotally connects the sliding latch with the pivoted handle-weight W. As best shown in Fig. 3, it is believed to be clear that the weight of the handle W normally pushes the latch to the right and tends to keep the latch-bar $v$ in the notch $n^2$ of the coupling.

In operating our invention, assuming the parts to be connected as illustrated in Fig. 3, the hand grasps the lever H, and one or two fingers are passed beneath the handle W. Lever H being slightly raised, the fingers easily withdraw the latch, and the lever is lowered upon the brace S, as already explained. To recouple the lever and scale elements, the end of lever H is raised directly upward. It is suitably guided into the lower fork of the coupling, and the latch-bar $v$ meets the curved ends of the fork $n'$. The fork cannot be displaced rearwardly, and the latch is necessarily moved toward the right until the latch-bar $v$ is raised above the notch, whereupon the weight of handle W effects the latching operation. We prefer to construct the latching devices without employing springs, as shown and explained.

Having now described our invention and set forth the mode of its operation, what we claim is—

1. In a scale-truck, the combination with with a scale-beam, of a scale-lever adapted to be raised or lowered by hand, a coupling having integrally-formed forks at its ends, one of said forks being pivotally coupled with the scale-beam and the remaining fork being provided with a latch-notch, a latching device secured to the said scale-lever, and guiding means arranged to guide the scale-lever when raised into the fork of said coupling, substantially as described.

2. In a scale-truck, the combination with a scale-beam, of a scale-lever adapted to be raised or lowered by hand, a coupling having integrally-formed forks at its ends, one of said forks being pivotally coupled with the scale-beam and the remaining fork being provided with a latch-notch, a latching device secured to the said scale-lever, guiding means arranged to guide said scale-lever when raised into the fork of the coupling, and a stop supported adjacent to the coupling in the path of said movable scale-lever whereby the coupling is protected from jars, substantially as described.

3. In a scale-truck, the combination with a scale-beam, of a scale-lever adapted to be raised or lowered by hand, a coupling having integrally-formed forks at its ends, one of said forks being pivotally coupled with the scale-beam and the remaining fork being provided wth a latch-notch, a latching device secured to the said scale-lever, guiding means arranged to guide said scale-lever when raised into the fork of the coupling, arms adapted to limit the lateral swinging movement of the coupling, and a stop supported adjacent to the coupling in the path of said movable scale-lever whereby the coupling is protected from jars, substantially as described.

4. In a scale-truck, the combination with a scale-beam, of a scale-lever adapted to be raised or lowered by hand, a coupling having integrally-formed forks at its ends, one of said forks being pivotally coupled with the scale-beam and the remaining fork being provided with a latch-notch, a latching device secured to the said scale-lever, guiding means arranged to guide said scale-lever when raised into the fork of the coupling, arms adapted to limit the lateral swinging movement of the coupling, and a stop supported adjacent to the coupling in the path of said movable scale-lever whereby the coupling is protected from jars, the said arms being extended above and in contact with the stop to reinforce the stop, substantially as described.

In testimony whereof we affix our signatures in presence of two witnesses.

EARNEST L. THOMPSON.
ARTIMUS E. SHELDON.

Witnesses:
A. C. MURPHEY,
H. BRUBAKER.